L. G. FALCON.
PULLEY BELT FASTENER.
APPLICATION FILED SEPT. 28, 1921.
1,406,831.
Patented Feb. 14, 1922.
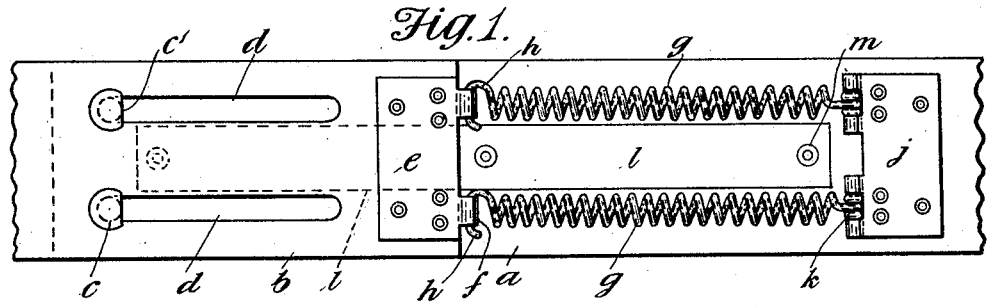
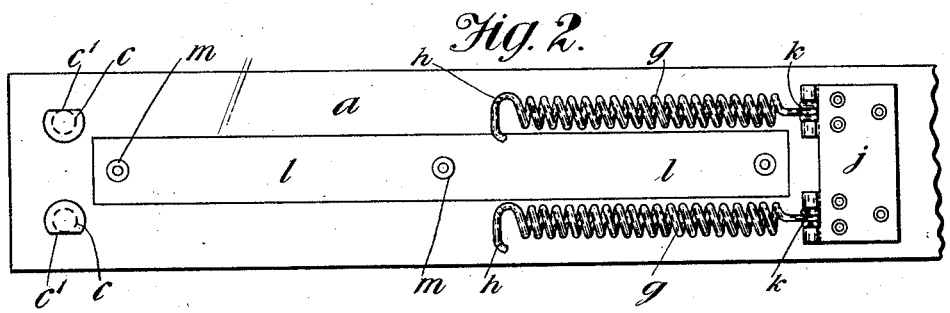
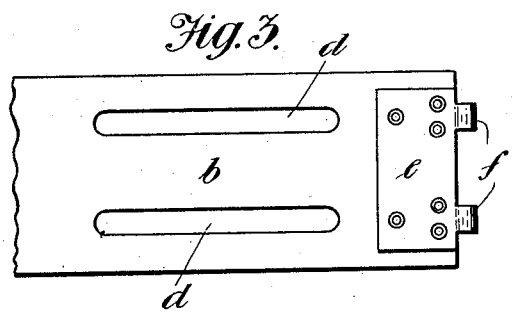
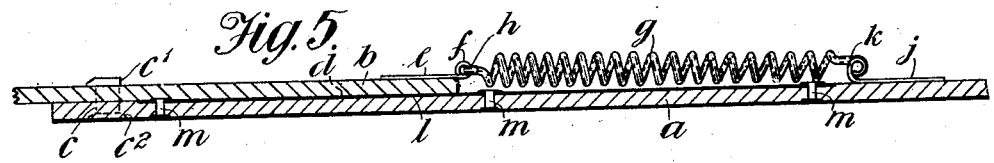
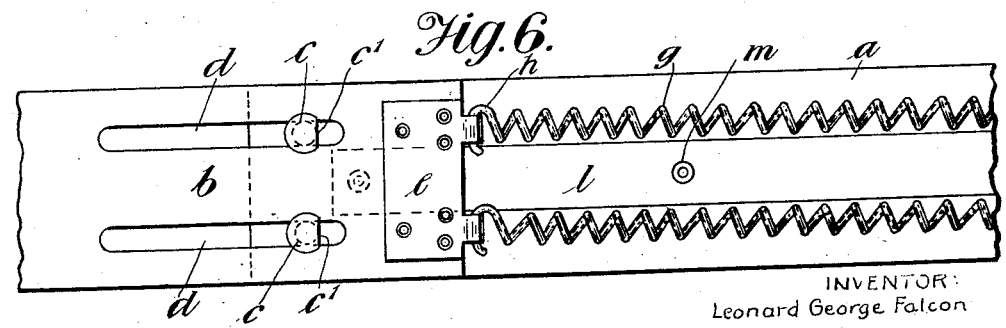
INVENTOR:
Leonard George Falcon
By Otto Munk his ATTORNEY.

UNITED STATES PATENT OFFICE.

LEONARD GEORGE FALCON, OF LUCINDALE, SOUTH AUSTRALIA, AUSTRALIA.

PULLEY-BELT FASTENER.

1,406,831. Specification of Letters Patent. Patented Feb. 14, 1922.

Application filed September 28, 1921. Serial No. 503,908.

*To all whom it may concern:*

Be it known that I, LEONARD GEORGE FALCON, a subject of His Majesty the King of Great Britain, and citizen of the Commonwealth of Australia, residing at Main Street, Lucindale, in the State of South Australia, Commonwealth of Australia, aforesaid, have invented certain new and useful Improvements in Pulley-Belt Fasteners, of which the following is a specification.

My invention relates to improvements in pulley belt fasteners, the object of the same being to provide means whereby the ends of a belt may be securely fastened together without interfering with its resiliency and its consequent smooth running, and in addition to the fastener I provide a flexible metal plate which assists in keeping the ends in proper and suitable position.

In order that my invention may be clearly understood I will now proceed to describe the same by aid of the accompanying drawings wherein:—

Fig. 1 is a plan showing belt ends fitted together with my invention.

Fig. 2 is a plan showing a single belt end.

Fig. 3 is a plan showing the opposite end of the belt to that which is illustrated in Fig. 2.

Fig. 4 is a cross section through two belt ends.

Fig. 5 is a longitudinal section through the center of belt ends shown in Fig. 1.

Fig. 6 is a plan of belt ends showing the belt in tension.

In each of the illustrations similar letters of reference are used to denote similar or corresponding parts wherever they occur.

In the drawings $a$ is the lower belt end and $b$ is the upper belt end. In the lower belt end I provide studs $c$ the bases of which are countersunk at $c^2$ a portion of the head being clipped off as indicated at $c^1$ to facilitate their passage through the slots or grooves $d$ in the adjacent belt end.

Upon the belt end $b$ I secure by rivets or other means a metal plate $e$ having extended eyes $f$ formed thereon for the accommodation of hooks.

Upon the belt end $a$ I provide tension springs $g$ which terminate at one end in hooks $h$ which are accommodated in the eyes $f$ previously referred to, the opposite ends of the springs being hinged at $k$ to the plate $j$ which is attached to the adjacent belt end by rivets or otherwise.

The belt end $a$ is further strengthened and stiffened by means of a flexible thin metal plate $l$ which is secured to the belt by the aid of rivets $m$. This plate if so desired may be slightly embedded within the belt as indicated in Fig. 5 of the drawings. This plate prevents possible bulging of end $a$ due to the action of springs $g$, especially when there is slack. The plate thus makes it certain that all of the slack will be taken up by the studs operating in slots $d$, and not by bulging or "buckling" of end $a$.

In applying my invention to practical use the belt ends are brought together, and the studs $c$ having been twisted or rotated to the position shown in Fig. 2 are then easily passed through the slots or grooves $d$ after which they may be restored to the working position shown in Fig. 1, in which position they are free to slide within the grooves. The hook ends $h$ are then inserted into the eyes $f$ of the plate $e$ thus flexibly joining the ends of the belt together so that it can be mounted on its pulley wheel.

In actual operation the springs $g$ which may be increased in number or in strength for wider belts will always take up the slack or sag of the belt as indicated in Figs. 1 and 5 of the drawings, but in event of shrinkage of the belt, or of severe strain the springs will automatically become elongated and the studs will likewise adjust themselves within the grooves so that the efficiency of the belt will always be maintained without danger of breakage.

Having now fully described my invention and in the manner in which it is to be utilized what I claim is:—

1. Means for fastening the ends of a pulley belt, said means comprising interconnected freely slidable parts on said ends and a resilient connection between said ends for automatically taking up slack and for yielding when said belt shrinks.

2. Means for fastening the ends of a pulley belt, one end of said belt having free sliding engagement with the other end of said belt, said other end having a resilient connection with said first end, said sliding engagement and resilient connection serving automatically to take up slack and yielding when said belt shrinks.

3. Means for fastening the ends of a pulley belt, the ends of said belt overlapping, and a connection between said ends, one of said ends having a reinforcing plate.

4. Means for fastening the ends of a pulley belt, the ends of said belt overlapping, and a connection between said ends, the lower of said ends having a reinforcing plate.

5. Means for fastening the ends of a pulley belt, the ends of said belt overlapping, and a connection between said ends, the lower of said ends having a flexible metal reinforcing plate.

6. Means for fastening the ends of a pulley belt, the ends of said belt overlapping, and a connection between said ends, the lower of said ends having a flexible metal reinforcing plate, said lower end having a recess in which said plate is embedded.

7. Means for fastening the ends of a pulley belt, said means comprising a spring connected to one of said ends and hingedly connected to the other of said ends.

8. Means for fastening the ends of a pulley belt, said means comprising a spring pivotally connected to one of said ends and hingedly connected to the other of said ends.

9. Means for fastening the ends of a pulley belt, said means comprising a spring pivotally connected to one of said ends and hingedly connected to the other of said ends, studs fixed to said other end, said first end having slots in which said studs are freely slidable.

10. Means for fastening the ends of a pulley belt, said means comprising a spring pivotally connected to one of said ends and hingedly connected to the other of said ends, studs fixed to said other ends, said first end having slots in which said studs are freely movable, and a flexible metal reinforcing plate fixed to the lower of said ends.

In testimony whereof he hath affixed his signature in presence of two witnesses.

LEONARD GEORGE FALCON.

Witnesses:
JOHN HUBERT COOKE,
MAIDA CATTERMOLE.